(12) United States Patent
Lagakos et al.

(10) Patent No.: US 7,149,374 B2
(45) Date of Patent: Dec. 12, 2006

(54) FIBER OPTIC PRESSURE SENSOR

(75) Inventors: Nicholas Lagakos, Silver Spring, MD (US); Joseph A. Bucaro, Herdon, VA (US); Jacek Jarzynski, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 48 days.

(21) Appl. No.: 10/927,650

(22) Filed: Aug. 24, 2004

(65) Prior Publication Data

US 2005/0041905 A1    Feb. 24, 2005

Related U.S. Application Data

(63) Continuation-in-part of application No. 10/446,256, filed on May 28, 2003.

(51) Int. Cl.
*G02B 6/00* (2006.01)
*G02B 6/26* (2006.01)

(52) U.S. Cl. ............... 385/12; 385/13; 385/115; 385/119

(58) Field of Classification Search ............... 385/12
See application file for complete search history.

(56) References Cited

U.S. PATENT DOCUMENTS

| | | | |
|---|---|---|---|
| 5,279,793 A | | 1/1994 | Glass |
| 5,422,478 A | * | 6/1995 | Wlodarczyk et al. .. 250/227.21 |
| 5,510,895 A | * | 4/1996 | Sahagen ............. 356/436 |
| 6,218,661 B1 | * | 4/2001 | Schroeder et al. ..... 250/227.14 |
| 6,281,976 B1 | | 8/2001 | Taylor et al. |
| 6,439,055 B1 | | 8/2002 | Maron et al. |
| 6,539,136 B1 | | 3/2003 | Dianov et al. |
| 6,597,820 B1 | | 7/2003 | Sheem |
| 6,738,145 B1 | * | 5/2004 | Sherrer et al. ............. 356/480 |
| 2004/0237629 A1 | * | 12/2004 | Lenzing et al. .......... 73/35.12 |

OTHER PUBLICATIONS

Allan J. Zuckerwar, Frank W. Cuomo, Trung D. Nguyen, Stephen A. Rizzi and Sherman A. Clevenson "High-temperature fiber-optic lever microphone" J.Acoust. Soc. Am. 97 (6), Jun. 1995 pp. 3605-3616.
Andong Hu, Frank W. Cuomo and Allan J. Zuckerwar "Theoretical and experimental study of a fiber optic microphone" J. Acoust. Soc. Am 91 (5), May 1992 pp. 3049-3056.
J.A. Bucaro and N. Lagakos, Lightweight Fiber Optics Microphones and Accelerometers, Review of Scientific Instruments. vol. 72 pp. 2816-2821 (Jun. 2001).
D.R. Miers, D. Raj and J.W. Berthold, "Design and Characterization of Fiber-Optic Accelerometers" Proc. Fiber Optic Laser Sensor V, DPIE vol. 838, pp. 314-317 (1987).
N.Lagakos, J. H. Cole, and J. A. Bucaro, "Microbend Fiber-optic Sensor," Applied Optics 26, p. 2171-2180 (Jun. 1987).
G.He and F. W. Cuomo, "Displacement Response, Detection Limit, and Dynamic Range of Fiber Optic Level sensors," J. Lightwave Tech., vol. 9, No. 11, p. 1618-1625 (Nov. 1991).
J.A. Bucaro and N. Lagakos,"Fiber Optics Pressure and Acceleration Sensors", Proceeding of the 47th International Instrument symposium, Denver, CO (May 6-10, 2001).

* cited by examiner

*Primary Examiner*—Frank G. Font
*Assistant Examiner*—Eric Wong
(74) *Attorney, Agent, or Firm*—John J. Karasek; Suresh Koshy

(57) ABSTRACT

A fiber optic pressure sensor includes an optical fiber for transmitting light. The optical fiber has an axis. The fiber optic pressure sensor also includes an etched diaphragm perpendicular to the axis. The diaphragm includes an operative side located at a distance from the optical fiber sufficient to reflect a portion of the transmitted light into the optical fiber. The etched diaphragm includes a semiconductor, a dielectric, and/or a metal.

56 Claims, 15 Drawing Sheets

FIBER OPTIC PRESSURE SENSOR

RELATED APPLICATION

This application is a continuation-in-part application of pending U.S. patent application Ser. No. 10/446,256 to Lagakos et al., entitled "Intensity Modulated Fiber Optic Pressure Sensor" and filed on May 28, 2003, which pending patent application is incorporated herein by reference in its entirety. The present patent application claims benefit of priority to the pending U.S. patent application Ser. No. 10/446,256.

TECHNICAL FIELD

The present invention relates generally to pressure sensors, and more particularly to fiber optic pressure sensors.

BACKGROUND ART

Active sound control systems often require specialized sensors, such as microphones to measure variations in atmospheric pressure. Commercially available electrical microphones, for example, detect pressure applied on their diaphragm by monitoring small changes in the capacitance measured between the diaphragm and a backplate placed closely to the diaphragm. Such electrical microphones are typically of two types: the electret microphone, which is biased by a built-in charge, and the condenser microphone, which is biased by an external voltage source. Electret microphones suffer from long-term instability due to their charge decay, whereas condenser microphones need a substantial external bias voltage, which in some applications is not desirable.

Both types of electrical microphones are susceptible to electromagnetic interference ("EMI"), which is strong at low frequencies. For example, in some active control systems, the presence of high voltages required for the controllers introduces substantial EMI, which increases the noise of the electrical microphones. To minimize EMI, electrical microphones often have a preamplifier attached to the microphone head. Lead wires close to the microphone head introduce extra capacitance, which can degrade the capacitance signal of the microphone. The lead capacitance problem is minimized by placing the preamplifier next to the microphone head. However, having the preamplifier next to the microphone head, even though minimizing EMI and lead capacitance noise, makes the microphone heavy, large, and expensive.

Examples of fiber optic microphones include those disclosed in "Theoretical and experimental study of a fiber optic microphone," Hu et al., J. Acoust. Soc. Am. 91 (5), May 1992, and "High-temperature fiber-optic lever microphone," Zuckerwar et al, J. Acoust. Soc. Am. 97 (6), June 1995. Hu et al. disclose a fiber optic microphone that includes a metallized Mylar membrane that is stretched and cemented to a fiber optic microphone case. Zuckerwar et al. disclose a fiber optic microphone cartridge that secures a membrane made of nickel 200 foil. Typical fiber optic microphones have a diaphragm diameter of around 0.55 cm, a diaphragm thickness of around 12.5 μm, and a minimum detectable pressure of around 5 mPa/Hz$^{1/2}$. Fiber optic microphones have typically not replaced electrical microphones in many applications because their performance and/or cost-effectiveness have been inadequate.

DISCLOSURE OF THE INVENTION

In an embodiment of the invention, an apparatus includes an optical fiber for transmitting light. The optical fiber has an axis. The fiber optic pressure sensor also includes an etched diaphragm perpendicular to the axis. The diaphragm includes an operative side located at a distance from the optical fiber sufficient to reflect a portion of the transmitted light into the optical fiber. The etched diaphragm includes a semiconductor, a dielectric, and/or a metal.

Optionally, the semiconductor diaphragm includes CdTe, CdZnTe, InP, InSb, GaAs, GaN, GaP, GaSb, Ge, Si, SiGe, Sn, ZnSe, ZnS, an oxide thereof, and/or a diamond. Optionally, the semiconductor diaphragm has a diaphragm thickness between 0.1 μm and 2 μm, and/or a cross-sectional width between 0.1 mm and 5 mm.

Optionally, the semiconductor diaphragm includes a reflective layer for reflecting the portion of the light into the optical fiber. For example, the reflective layer includes aluminum, beryllium, chromium, copper, gold, molybdenum, nickel, platinum, rhodium, silver, tungsten, and/or an alloy thereof.

Optionally, the semiconductor diaphragm includes an exposed side opposite to said operative side. A protective layer is located adjacent to said exposed side. For example, the protective layer includes a semiconductor, an oxide ceramic, and/or a non-oxide ceramic. For example, the semiconductor includes CdTe, CdZnTe, InP, InSb, GaAs, GaN, GaP, GaSb, Ge, Si, SiGe, Sn, ZnSe, ZnS, an oxide thereof, and/or a diamond. For example, the oxide ceramic includes MgO, $TiO_2$, $SiO_2$, $MnO_2$, $Cr_2O_3$, $Fe_2O_3$, and/or $Al_2O_3$. For example, the non-oxide ceramic includes BN and/or $TiB_2$. For example, protective layer defines at least one hole.

Optionally, a housing surrounds the optical fiber. A head encloses a portion of the housing. The housing and the head defines a gas reservoir. The head includes a spacer between the optical fiber and the diaphragm. The spacer defines one or more apertures communicating with the gas reservoir. For example, the spacer includes a spacer thickness. The spacer thickness is about equal to the distance. For example, the distance is between 170 μm and 270 μm, or between 700 μm and 1100 μm.

Optionally, a light source communicates with the optical fiber for generating the light transmitted through the optical fiber. For example, the light source includes a light emitting diode, an amplified spontaneous emission light source, a gas laser, a dye laser, and/or a laser diode.

Optionally, a photodetector communicates with the optical fiber to receive the portion of reflected light. For example, the photodetector includes a PIN detector, an avalanche photodiode, a photomultiplier tube, and/or a metal-semiconductor-metal detector.

In another embodiment of the invention, an apparatus includes a transmitting optical fiber for transmitting light. The transmitting optical fiber includes a transmitting end having a transmitting axis. The apparatus also includes one or more receiving optical fibers each having a receiving end having a receiving axis. The apparatus also includes a semiconductor diaphragm perpendicular to the transmitting axis and the receiving axis, and located at a distance from the optical fiber sufficient to reflect a portion of the light from the transmitting end to the receiving end.

Optionally, the one or more receiving optical fibers includes a plurality of receiving optical fibers. For example, the plurality of receiving optical fibers includes three, four, five, six, seven, and/or eight receiving optical fibers.

In another embodiment of the invention, an apparatus includes a transmitting optical fiber for transmitting light. The transmitting optical fiber includes a transmitting end having a transmitting axis. The apparatus also includes one or more receiving optical fibers, each comprising a receiving end having a receiving axis parallel to the transmitting axis. The apparatus also includes a semiconductor diaphragm located at a distance from the optical fiber sufficient to reflect a portion of the light from the transmitting end to the receiving end.

In another embodiment of the invention, an apparatus includes an optical fiber for transmitting light. The optical fiber includes an axis. The apparatus also includes an etched diaphragm perpendicular to the axis. The diaphragm includes an operative side located at a distance from the optical fiber sufficient to reflect a portion of the transmitted light into the optical fiber. The etched diaphragm includes a semiconductor, a dielectric, and/or a metal.

Optionally, the etched diaphragm includes a reactive ion etched diaphragm, a chemical etched diaphragm, and/or a mechanical etched diaphragm. For example, the etched diaphragm includes a diaphragm thickness between 0.1 µm and 2 µm, and/or a cross-sectional width between 0.1 mm and 5 mm. For example, the semiconductor includes CdTe, CdZnTe, InP, InSb, GaAs, GaN, GaP, GaSb, Ge, Si, SiGe, Sn, ZnSe, ZnS, an oxide thereof, and/or a diamond. For example, the dielectric includes $SiO_2$, SiN, SiC, and/or $Si_3N_4$. For example, the metal includes aluminum, beryllium, chromium, copper, gold, molybdenum, nickel, platinum, rhodium, silver, tungsten, and/or an alloy thereof.

In another embodiment of the invention, an apparatus includes a transmitting optical fiber for transmitting light. The transmitting optical fiber includes a transmitting end having a transmitting axis. The apparatus also includes one or more receiving optical fibers, each comprising a receiving end having a receiving axis. The apparatus also includes an etched diaphragm perpendicular to the transmitting axis and the receiving axis, and located at a distance from the optical fiber sufficient to reflect a portion of the light from the transmitting end to the receiving end. The etched diaphragm includes a semiconductor, a dielectric, and/or a metal.

Optionally, the etched diaphragm includes a reactive ion etched diaphragm, a chemical etched diaphragm, and/or a mechanical etched diaphragm. The etched diaphragm includes a diaphragm thickness between 0.1 µm and 2 µm, and/or a cross-sectional width between 0.1 mm and 5 mm. For example, the semiconductor includes CdTe, CdZnTe, InP, InSb, GaAs, GaN, GaP, GaSb, Ge, Si, SiGe, Sn, ZnSe, ZnS, an oxide thereof, and/or a diamond. For example, the dielectric comprises $SiO_2$, SiN, SiC, and/or $Si_3N_4$. For example, the metal includes aluminum, beryllium, chromium, copper, gold, molybdenum, nickel, platinum, rhodium, silver, tungsten, and/or an alloy thereof.

In another embodiment of the invention, an apparatus includes a transmitting optical fiber for transmitting light. The transmitting optical fiber includes a transmitting end having a transmitting axis. The apparatus also includes one or more receiving optical fibers, each comprising a receiving end having a receiving axis parallel to the transmitting axis. The apparatus also includes an etched diaphragm located at a distance from the optical fiber sufficient to reflect a portion of the light from the transmitting end to the receiving end. The etched diaphragm includes a semiconductor, a dielectric, and/or a metal.

Optionally, the etched diaphragm includes a reactive ion etched diaphragm, a chemical etched diaphragm, and/or a mechanical etched diaphragm. For example, the etched diaphragm comprises at least one of a diaphragm thickness between 0.1 µm and 2 µm, and a cross-sectional width between 0.1 mm and 5 mm. For example, the semiconductor includes CdTe, CdZnTe, InP, InSb, GaAs, GaN, GaP, GaSb, Ge, Si, SiGe, Sn, ZnSe, ZnS, an oxide thereof, and/or a diamond. For example, the dielectric includes $SiO_2$, SiN, SiC, and/or $Si_3N_4$. For example, the metal includes aluminum, beryllium, chromium, copper, gold, molybdenum, nickel, platinum, rhodium, silver, tungsten, and/or an alloy thereof.

Advantageously, an embodiment of the instant invention has EMI immunity, as its sensor output is optical and its electro-optical components can be placed remote from its diaphragm.

Advantageously, an embodiment of the instant invention does not require a preamplifier, reducing its weight and size than might otherwise be possible.

Advantageously, an embodiment of the instant invention has, for example, a diaphragm diameter of around 0.16 cm, a diaphragm thickness of around 1.5 µm, and a minimum detectable pressure of around 3 $mPa/Hz^{1/2}$. Total sensor size for an embodiment of a fiber optic sensor according to the instant invention, for example, is 2.8 mm o.d. and 0.5" long.

Fiber optic sensors according the instant invention benefit from potentially high bandwidth, high security, and operation in hostile environments, such as environments with high electric fields and/or chemically corrosive and explosive environments. They can be used singly or in arrays, and are thus suitable for a variety of applications, such as structural or mechanical integrity applications, and medical applications. By way of example, an embodiment of a fiber optic sensor according to the instant invention, if placed near to a motor would detect changes in frequencies of sounds from the motor, which might indicate an impending structural flaw or undesirable wear. As another example, the potentially slim design of an embodiment of a fiber optic sensor according to the instant invention makes it ideal for minimally invasive medical diagnostic procedures.

BRIEF DESCRIPTION OF THE DRAWINGS

FIG. 1b is a cross-sectional view taken through line 1b—1b of FIG. 1a.

FIG. 1c is a cross-sectional view taken through line 1c—1c of FIG. 1a.

FIG. 2b is a cross-sectional view taken through line 2b—2b of FIG. 2a.

FIG. 3b is a cross-sectional view taken through line 4b—4b of FIG. 3a.

FIG. 4b is a cross-sectional view taken through line 4b—4b of FIG. 4a.

FIG. 4c is a cross-sectional view taken through line 4c—4c of FIG. 4a.

FIG. 4d is a cross-sectional view taken through line 4d—4d of FIG. 4a.

BEST MODES OF CARRYING OUT THE INVENTION

Figure 1A:
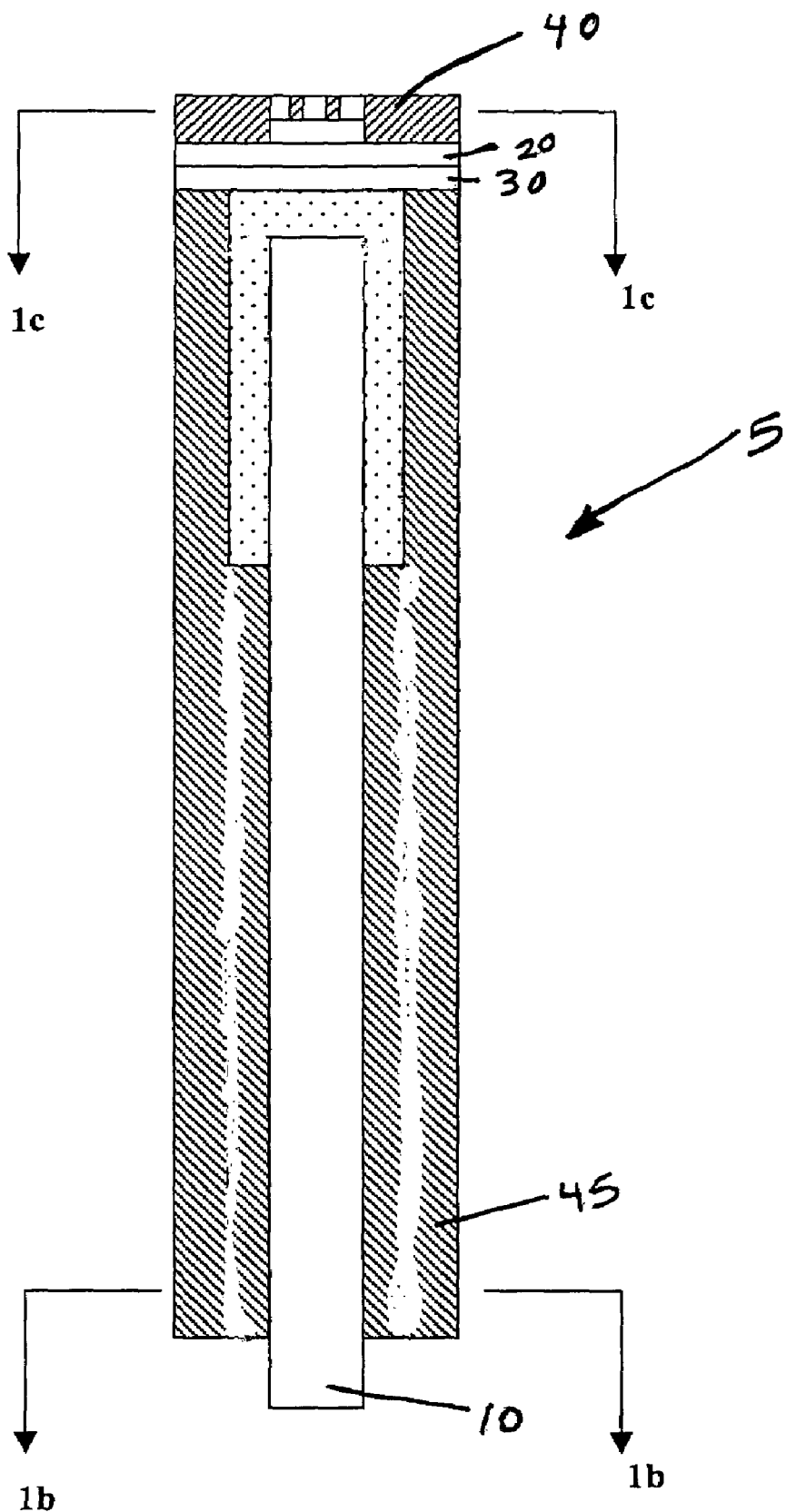
FIG. 1a is a cross-sectional view of an embodiment of the invention.
Figure 1B:
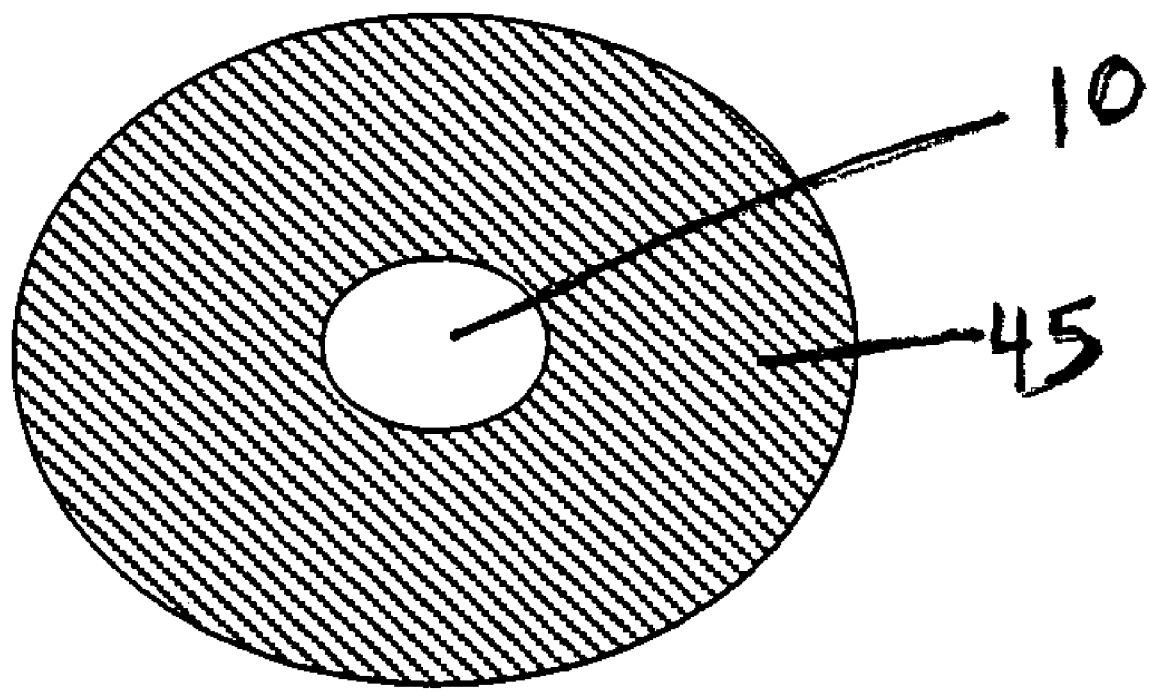
Figure 1C:
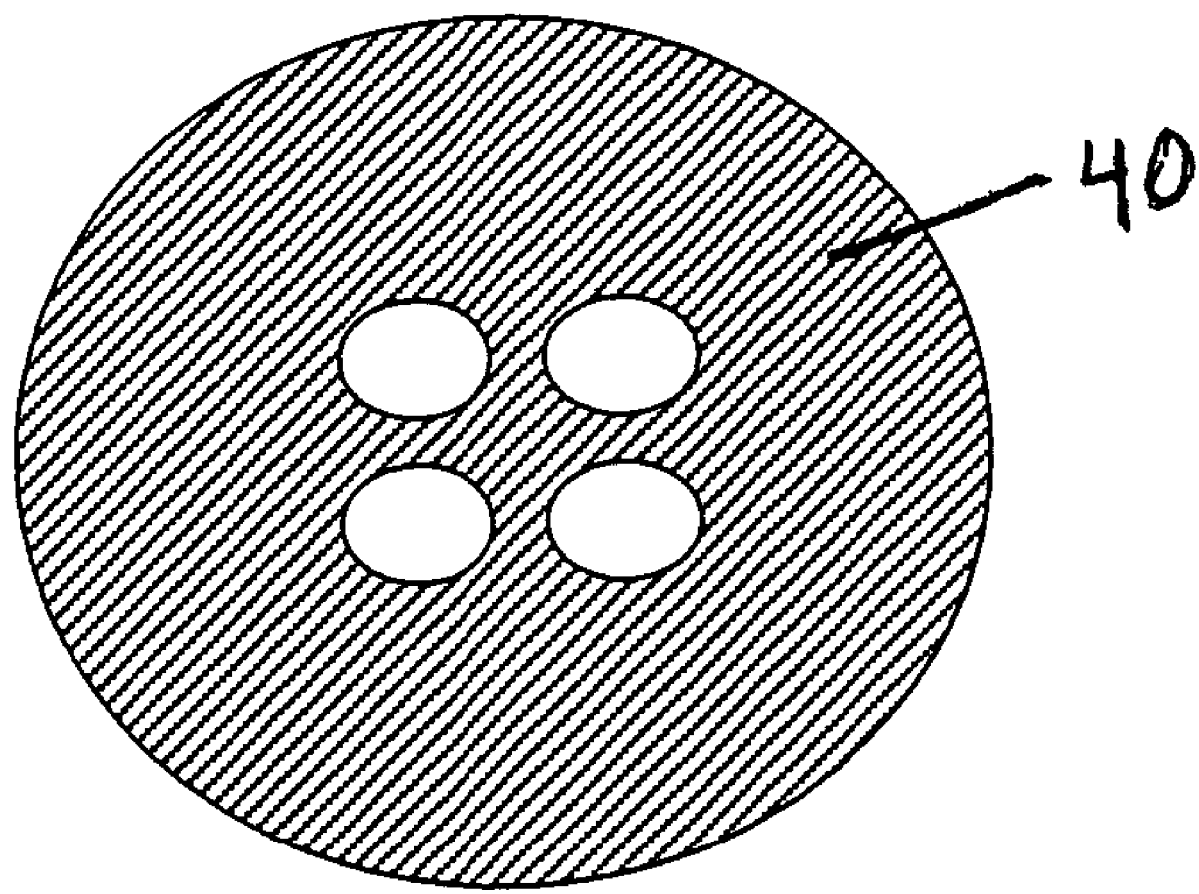

A reflection-type intensity modulated fiber optic sensor 5 according to the instant invention which can detect pressure is described by way of example in FIGS. 1a, 1b, 1c as follows. For the purpose of this discussion, such a fiber optic sensor is called a 1 fiber probe. An optical fiber 10 is perpendicularly positioned at a distance from an etched diaphragm 20 sufficient to reflect at least a portion of light passing through and exiting from the optical fiber 10 back into the optical fiber 10. The optical fiber 10 is a single mode or a multi-mode optical fiber, depending at least in part on cost constraints or performance requirements of the fiber optic sensor 5. Upon a change in the atmospheric pressure, pressure waves cause the etched diaphragm 20 to distort causing a change in the amount of light reflected by an operative side of the etched diaphragm 20 back into the optical fiber 10. The intensity of the light coupled into the optical fiber 10 modulates in relation to the intensity of the pressure wave causing the etched diaphragm 20 to distort.

The etched diaphragm 20 includes a material amenable to a planar processing step of etching. Examples of suitable types of etching depend on the diaphragm material and include reactive ion etching, chemical etching, and mechanical etching. Acceptable diaphragm materials include, for example, semiconductors, dielectrics, and metals. Acceptable semiconductors include, for example, CdTe, CdZnTe, InP, InSb, GaAs, GaN, GaP, GaSb, Ge, Si, SiGe, Sn, ZnSe, ZnS, an oxide of any of these semiconductor materials, and/or a diamond. Acceptable dielectrics include, for example, $SiO_2$, SiN, SiC, and/or $Si_3N_4$. Acceptable metals include, for example, aluminum, beryllium, chromium, copper, gold, molybdenum, nickel, platinum, rhodium, silver, tungsten, and/or an alloy of one or more of these metals. Optionally, the etched diaphragm 20 has a diaphragm thickness and a cross-sectional width that depend, for example, on characteristics of the atmospheric pressure changes to be detected and/or robustness of the fiber optic sensor. For example, the etched diaphragm 20 has a diaphragm thickness between 0.1 μm and 2 μm. For example, the etched diaphragm 20 has a cross-sectional width between 0.1 mm and 5 mm.

Optionally, a reflective layer 30 is located on an operative side of the etched diaphragm 20 for reflecting at least a portion of the light back into the optical fiber 10. The reflective layer 30 includes, for example, a reflective metal such as aluminum, beryllium, chromium, copper, gold, molybdenum, nickel, platinum, rhodium, silver, tungsten, and/or an alloy of any of these reflective metals.

A preferred distance between the tip of the optical fiber 10 and either the etched diaphragm 20 or the reflective layer 30 depends on the physical characteristics of the material from which the light is being reflected and/or characteristics of the light itself. For example, for an etched diaphragm 20 made of silicon, such preferred distances are between 170 μm and 270 μm, and between 700 μm and 1100 μm.

Optionally, a protective layer 40 is located on an exposed side of the etched diaphragm 20. The protective layer 40 helps maintain the structural integrity of the etched diaphragm 20 during use of the fiber optic sensor 5. Optionally, the protective layer 40 includes one or more holes, exposing the etched diaphragm 20 to the environment from which the atmospheric pressure changes are to be detected. The protective layer 40 includes a material that can withstand the environmental use of the fiber optic sensor while protecting the etched diaphragm. For example, the protective layer 40 includes a semiconductor, an oxide ceramic, and/or a non-oxide ceramic. The semiconductor includes, for example, CdTe, CdZnTe, InP, InSb, GaAs, GaN, GaP, GaSb, Ge, Si, SiGe, Sn, ZnSe, ZnS, an oxide of one of these semiconductor materials, and/or a diamond. The oxide ceramic includes, for example, MgO, $TiO_2$, $SiO_2$, $MnO_2$, $Cr_2O_3$, $Fe_2O_3$, and/or $Al_2O_3$. The non-oxide ceramic comprises, for example, BN and/or $TiB_2$.

Optional housing 45, connected directly or indirectly to the etched diaphragm 20, surrounds the optical fiber 10. For example, the housing 45 includes stainless steel tubing to protect the optical fiber 10. Tubing having other protective materials are also suitable.

Figure 2A:
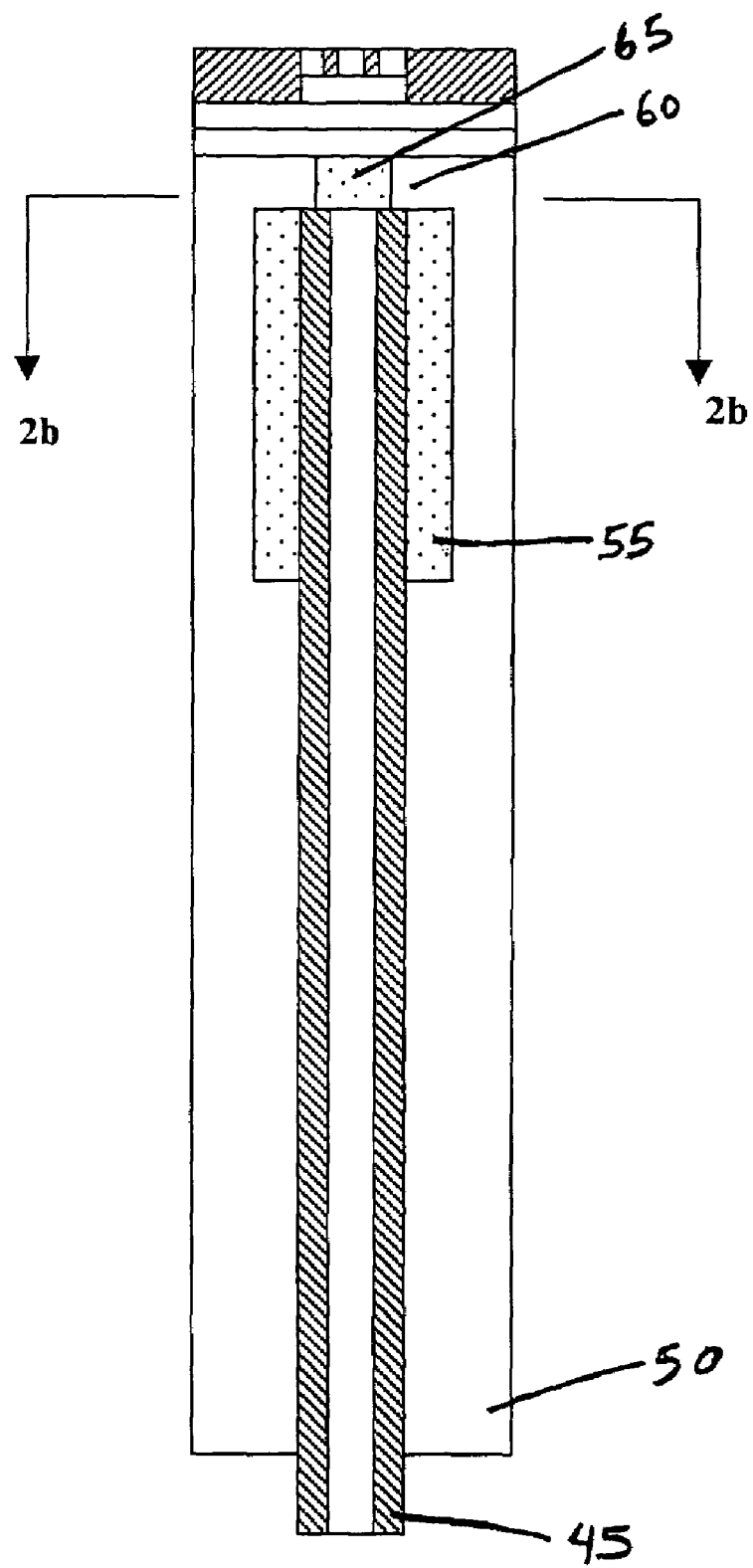
FIG. 2a is a cross-sectional view of an embodiment of the invention.
Figure 2B:
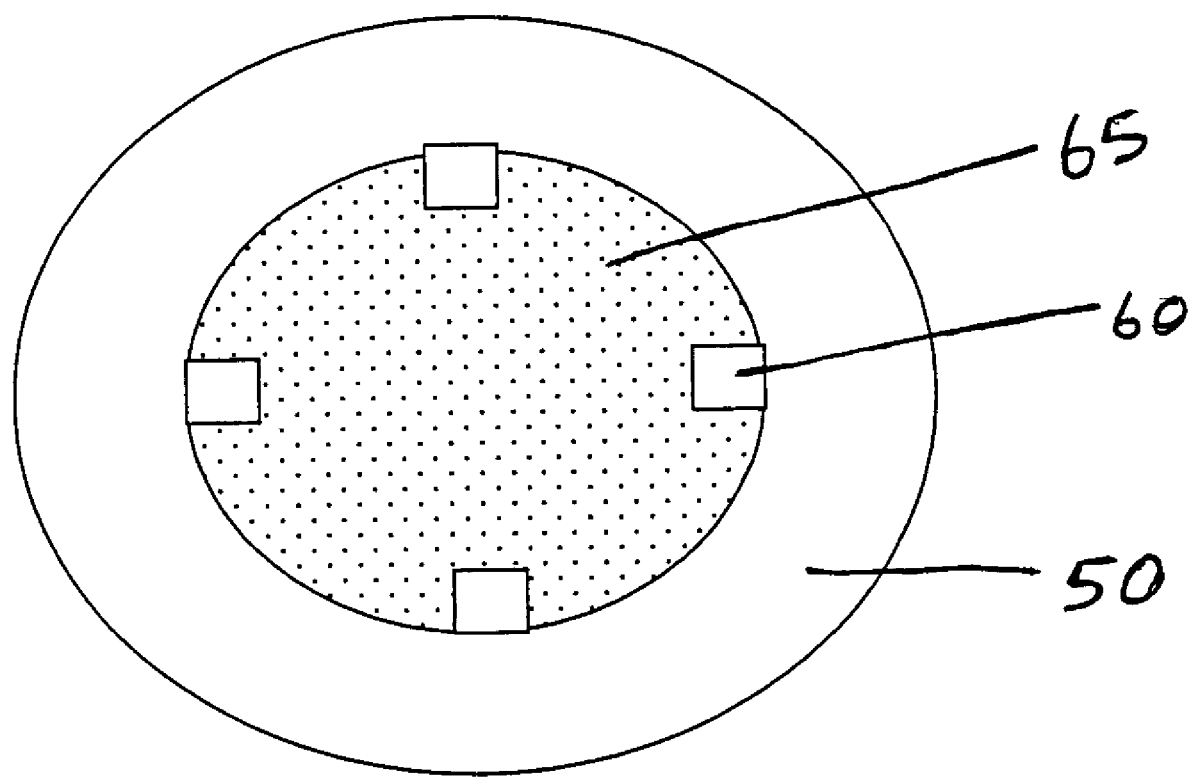

An optional head 50 surrounding an end of the optical fiber 10 is shown, by way of example, in FIGS. 2a and 2b. The head 50 optionally includes one or more spacers 60 between the tip of the optical fiber 10 and either the etched diaphragm 20 or the reflective layer 30. The thickness of the spacers 60 is selected, for example, to fix a distance between the end of the optical fiber 10 and the etched diaphragm 20. Such a distance is, for example, between 170 μm and 270 μm, or between 700 μm and 1100 μm for an etched diaphragm 20 made at least in part of silicon. The head 50 optionally includes a cavity such that the head 50 and housing 45 define a gas reservoir 55. Also, optionally, there is a gas space 65 between the tip of the optical fiber 10 and either the etched diaphragm 20 or the reflective layer 30, the gas space 65 being at least partially bounded by the one or more spacers 60. Optionally, the one or more spacers 60 define one or more apertures, which permit communication between the gas space and the gas reservoir. The gas, for example, is air. The communication between the gas space 65 and the gas reservoir 55, for example, reduces gas pressure build-up in the gas space upon distortion of the etched diaphragm 20.

The light is generated by an optional light source (not shown), which is optically connected directly, or indirectly via one or more lens, filters, or other beam-splitters, to the optical fiber 10. The selection of the light source depends at least in part on cost constraints or performance requirements of the fiber optic sensor. Optionally, the light source generates coherent light. For example, such a light source includes one or more laser diodes ("LD"), gas lasers, or dye lasers. Alternatively, the light source generates incoherent light. For example, such a light source includes one or more light emitting diodes ("LED") or amplified spontaneous emission ("ASE") light sources.

Figure 3A:
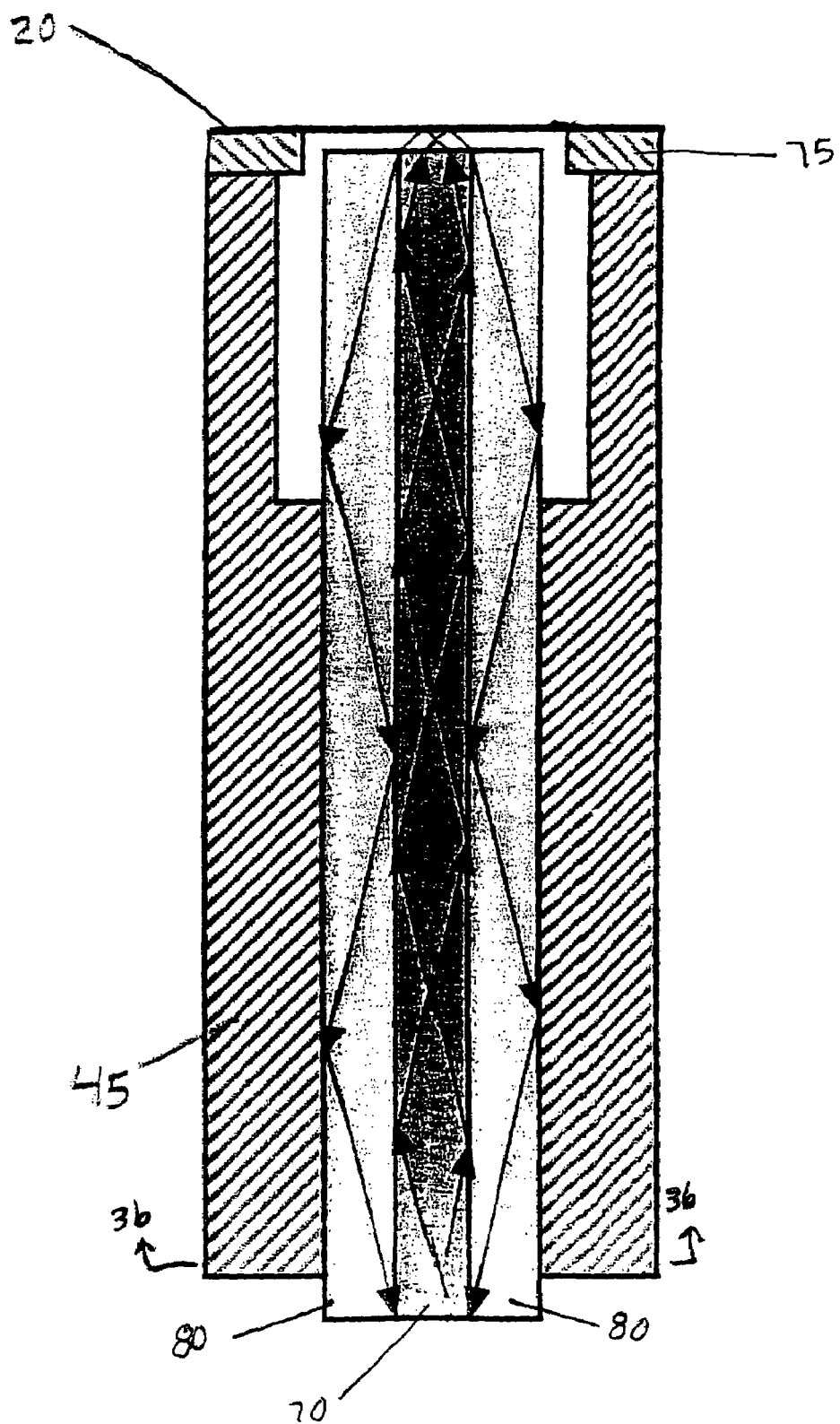
FIG. 3a is a cross-sectional view of an embodiment of the invention.
Figure 3B:
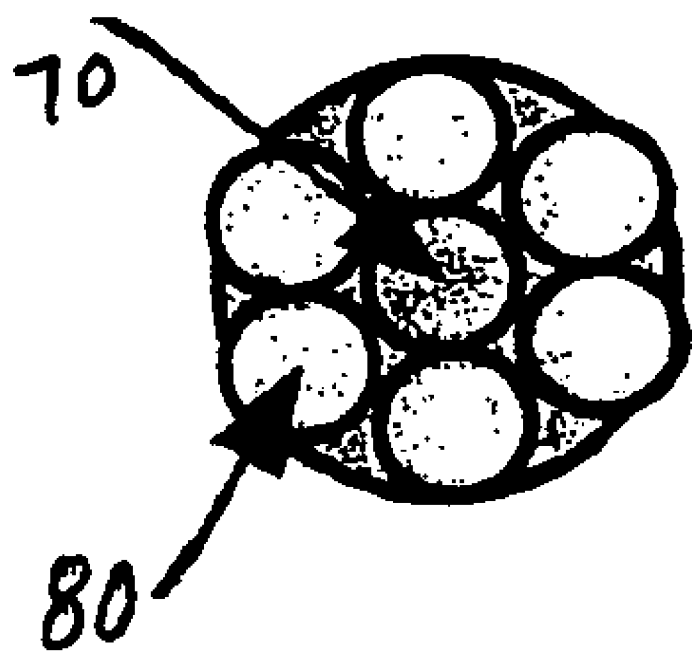

An optional photodetector (not shown) is optically connected directly, or indirectly via one or more lens, filters, or other beam-splitters, to the optical fiber 10 to detect light reflected from the etched diaphragm 20. The photodetector includes, for example, one or more PIN detectors, avalanche photodiode, photomultiplier tubes, and metal-semiconductor-metal ("MSM") detectors. FIGS. 3a and 3b show, by way of example, another embodiment of the invention. For brevity, only the differing characteristics of the embodiment of FIGS. 3a and 3b relative to that of FIGS. 1a, 1b, and 1c will be discussed below. A light source (not shown) is optically connected directly, or indirectly via one or more lens, filters, or other beam-splitters, to at least one transmitting optical fiber 70. At least a portion of the light reflects from the etched diaphragm 20 into one or more receiving optical fibers 80. The axes of the ends of the transmitting and receiving optical fibers 70, 80 closest to the etched diaphragm 20 are perpendicular to the etched diaphragm 20. The axes of the transmitting and receiving optical fibers 70, 80 are substantially parallel. Optionally, the surfaces of the transmitting and receiving optical fibers 70, 80 are abutting. Additionally, it is understood that the receiving optical fibers 80 may entwine around the one or more transmitting optical fibers 70 such that the distance between the surface of each receiving optical fiber 80 and the one or more transmitting optical fibers 70 is constant, although technically the axes thereof may not be exactly parallel. These characteristics, for example, help minimize the cross-sectional width of the fiber optic sensor according to the instant invention. A photodetector is optically connected directly, or indirectly via one or more lens, filters, or other beam-splitters, to the one or more receiving optical fibers 80 to detect the reflected light. As the number of receiving optical fibers 80 is increased, a greater percentage of the reflected light is detected. For example, the number of receiving optical fibers 80 is between three and eight.

FIG. 3a also shows an optional supporting structure 75 for supporting the etched diaphragm 20. The supporting structure 75 is attached to the diaphragm 20 and interposed between the diaphragm 20 and the housing 45. For instance, the supporting structure includes a substrate on which the diaphragm 20 is formed. The substrate includes, for example, a semiconductor, a dielectric, and/or a metal. The thickness of the supporting structure 75 is, for example, one, two, three, or four orders of magnitude greater than the thickness of the diaphragm 20. For example, the supporting structure 75 includes an annular or other conforming shape around the periphery of the diaphragm 20. By way of illustration, because of the thinness of the diaphragm 20, the diaphragm itself may be difficult to manipulate easily without inadvertent breakage. Such a supporting structure 75 facilitates the manufacture of the etched diaphragm 20 and/or its connection to the housing 45.

Figure 4A:
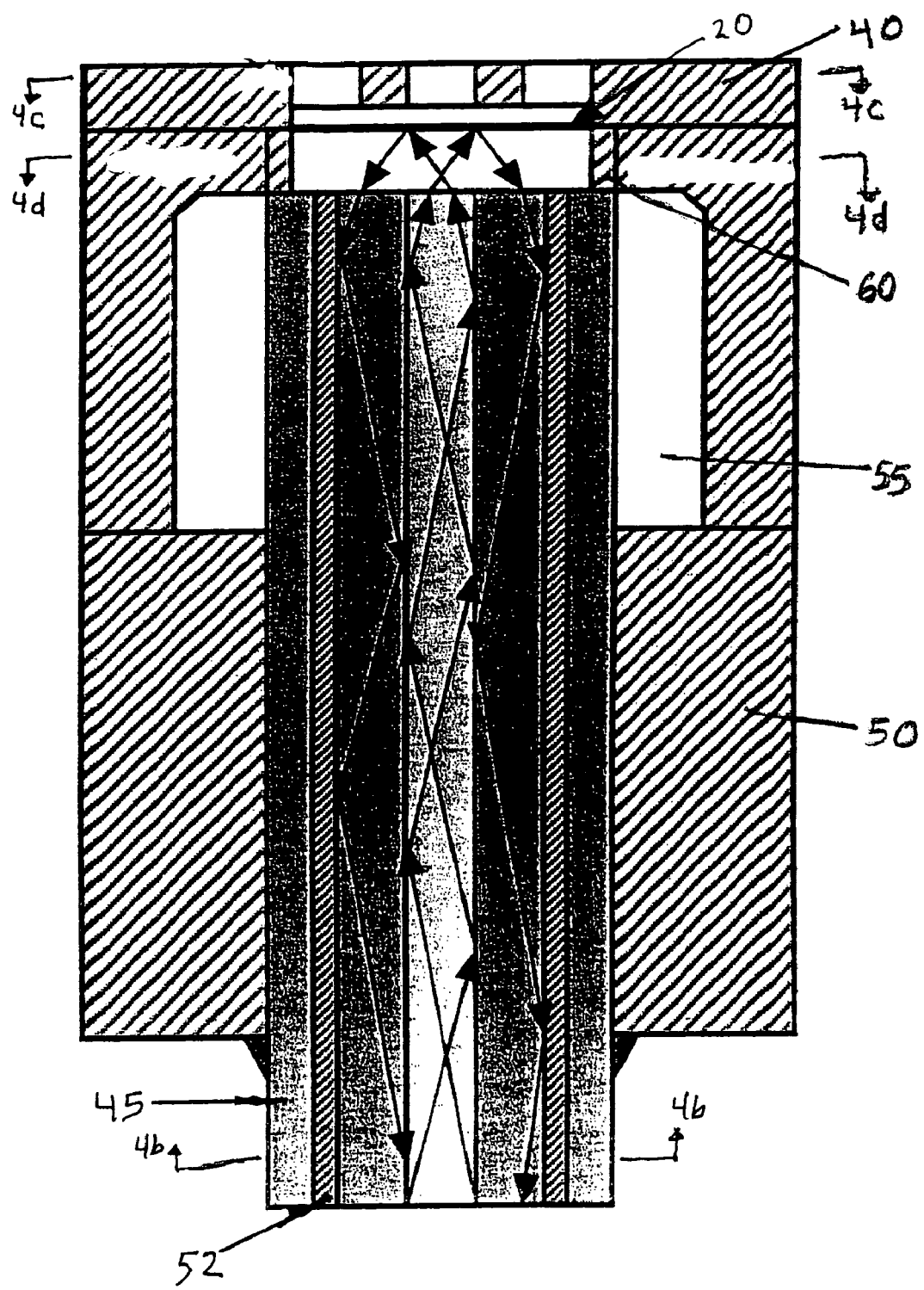
FIG. 4a is a cross-sectional view of an embodiment of the invention.
Figure 4B:
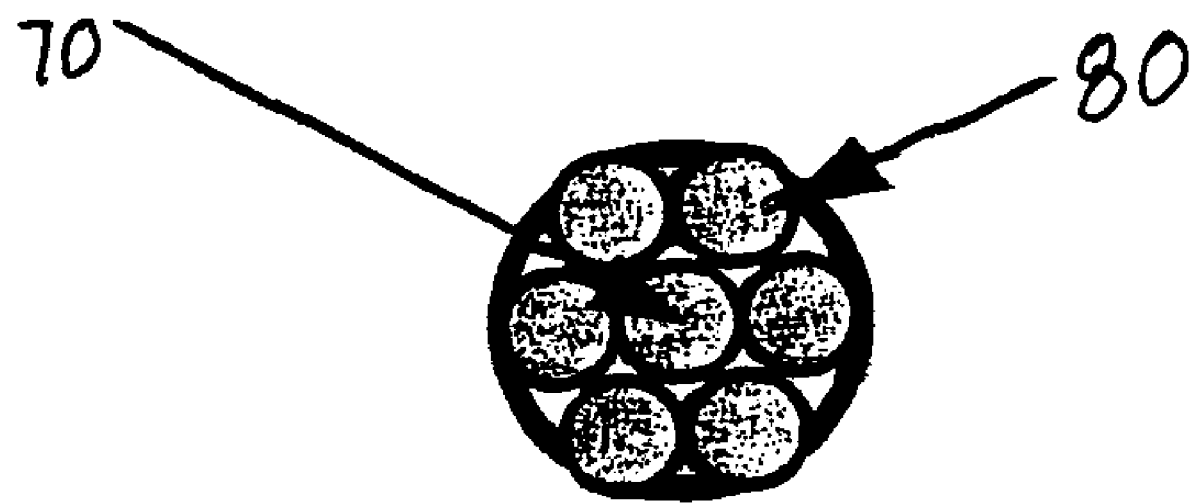
Figure 4C:
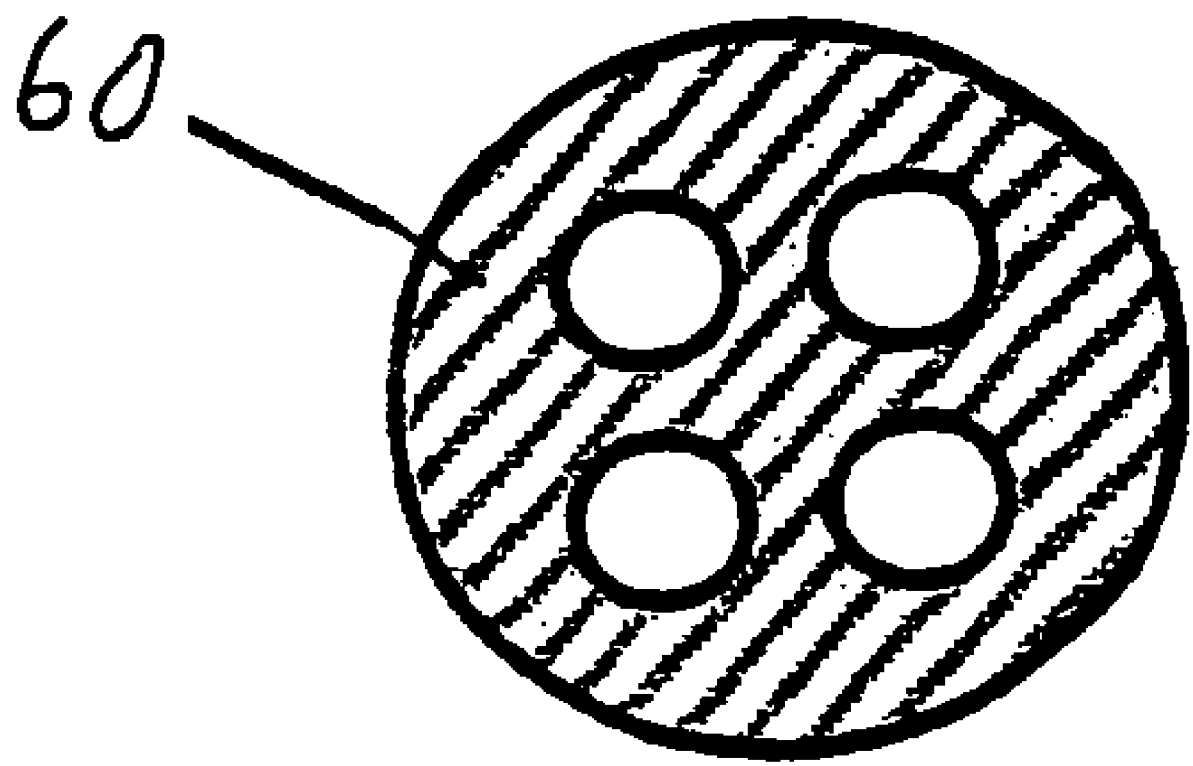
Figure 4D:
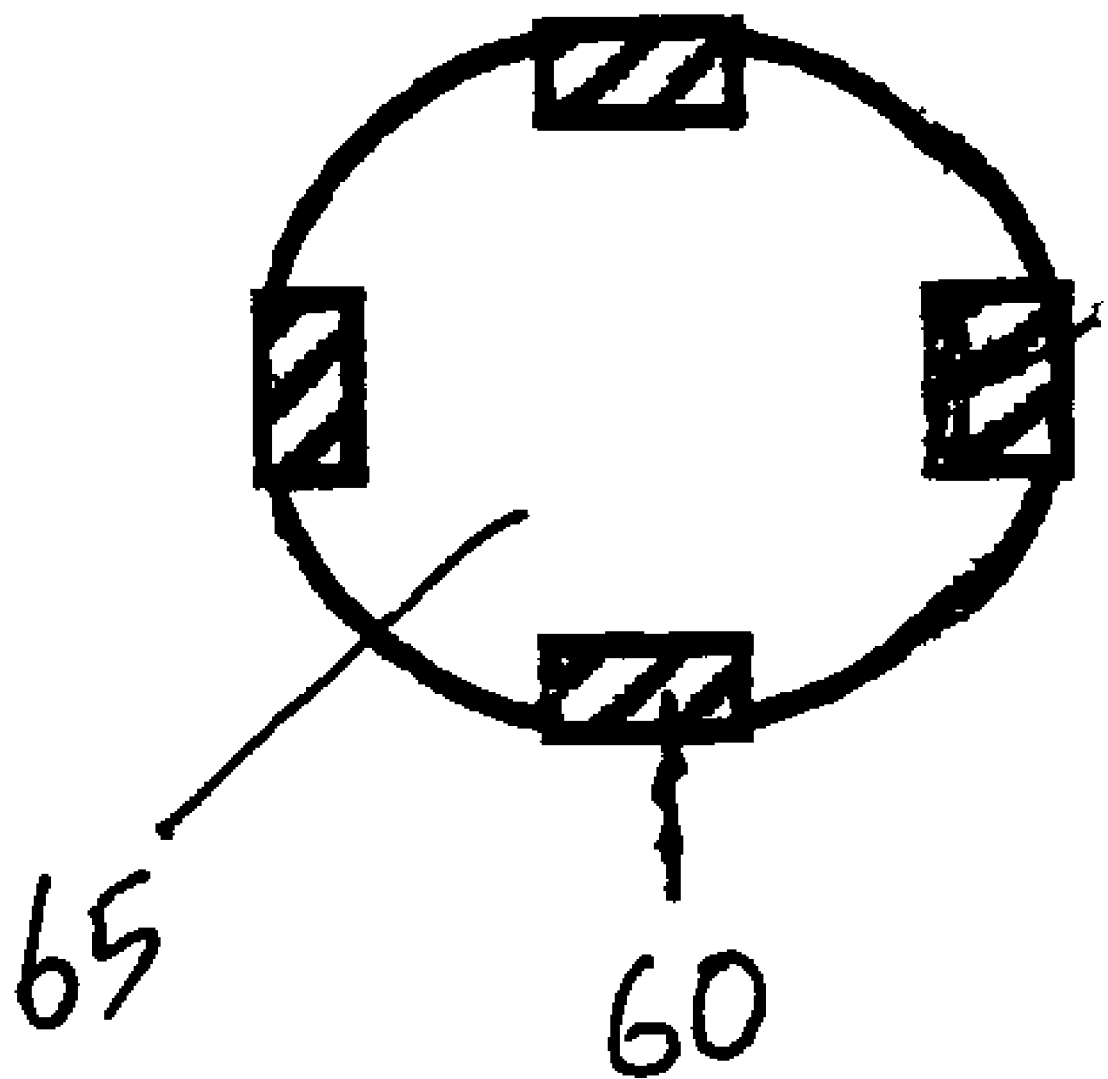

FIGS. 4a, 4b, 4c, and 4d show aspects of an optional head 50 analogous to the optional head shown in FIGS. 2a and 2b. FIG. 4a shows the optional head surrounding the housing 45, which in turn surrounds the one or more transmitting optical fibers 70 and one or more receiving optical fibers 80. Optionally, a fastener 52 (e.g., epoxy, acrylate adhesive) is used to fix the position and/or orientation of the optical fibers 70, 80 within the housing 45. FIG. 4b shows an exemplary cross-section of the transmitting optical fiber 70 and the receiving optical fibers 80. FIG. 4c shows an illustrative cross-section of a protective layer 40. FIG. 4d shows an illustrative cross-section of a head 50.

For the purpose of this discussion, a fiber optic sensor according to the instant invention having one transmitting optical fiber 70 and six receiving optical fibers 80 is called a 7 fiber probe. In an embodiment of a 7 fiber probe, light is coupled from a light source, e.g., a LED, into a transmitting optical fiber 70, e.g., a multimode fiber, propagates to the well polished fiber end, is emitted from the fiber end, and is reflected back by an etched diaphragm 20 closely located to the fiber end. Part of the reflected light is coupled into the transmitting optical fiber 70, and part of the reflected light is coupled into a bundle of six receiving optical fibers 80 and is detected by a photodetector. Vibration of the diaphragm center due to incoming sound pressure will modulate the detected light power.

A description of various performance characteristics of an embodiment of the 1 fiber probe and of an embodiment of the 7 fiber probe follows. It should be understood that all materials, dimensions, component models or manufacturers, connection means, steps, and masks are all given by way of non-limiting example to simplify examination and comparison of two illustrative embodiments of the instant invention.

For the purposes of this examination and comparison, embodiments of the 1 and 7 fiber probes use a multimode fiber having a 200 μm glass core, a 230 μm plastic (HCS, Spectran Specialty Optics) clad, a 500 μm Tefzel coating, and a 0.37 numerical aperture. The light source used in this work is an Optek OPF370A LED emitting light at 850 nm wavelength and the detector is a silicon PIN. Another optical component utilized in the 1 fiber probe is a 50/50 (at 850 nm), low loss, fiber coupler manufactured by Gould Electronics. The 1 fiber probe housing is a stainless steel tubing of 902 μm o.d and 584 μm i.d. The fiber was inserted in the tubing with its coating and epoxy was applied on the fiber. After the epoxy was cured, the fiber was cut closely to the tubing end and was polished very well.

Figure 5:
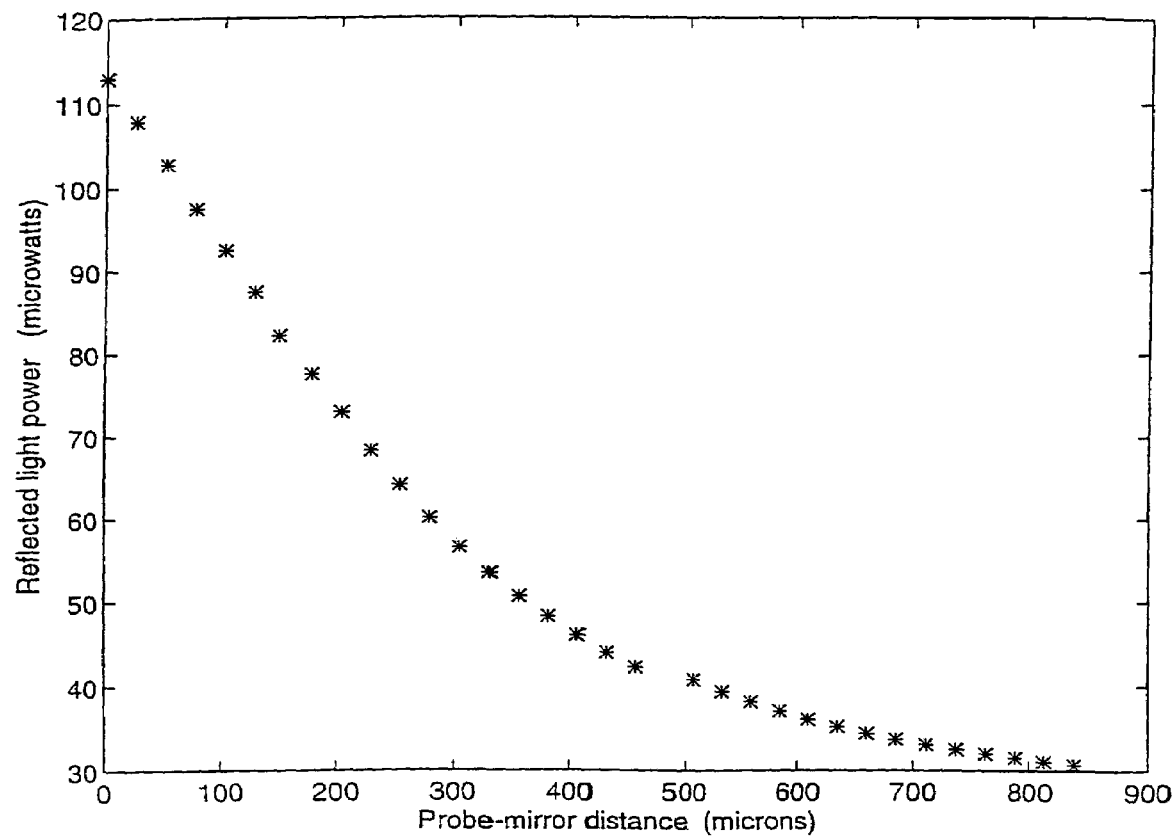
FIG. 5 is graph plotting the power of the reflected light as a function of probe-mirror distance for an embodiment of a 1 fiber probe according to the instant invention.

The displacement sensitivity of the 1 fiber probe was studied by mounting it on a micrometer translator which could be displaced manually against a mirror mounted on a piezoelectric transducer (PZT-4 cylinder of 2"o.d and 3" length) which could be vibrated electrically. First, the 1 fiber probe displacement sensitivity was achieved by displacing manually the probe against the mirror in steps of 25.4 μm using the micrometer translator. The results of this test are shown in FIG. 5 where the power of the reflected light coupled into the same fiber is plotted vs. the probe-mirror distance. As can be seen from FIG. 5, maximum displacement sensitivity is achieved in the 0–150 μm probe-mirror distance, for this embodiment of the 1 fiber probe.

Figure 6:
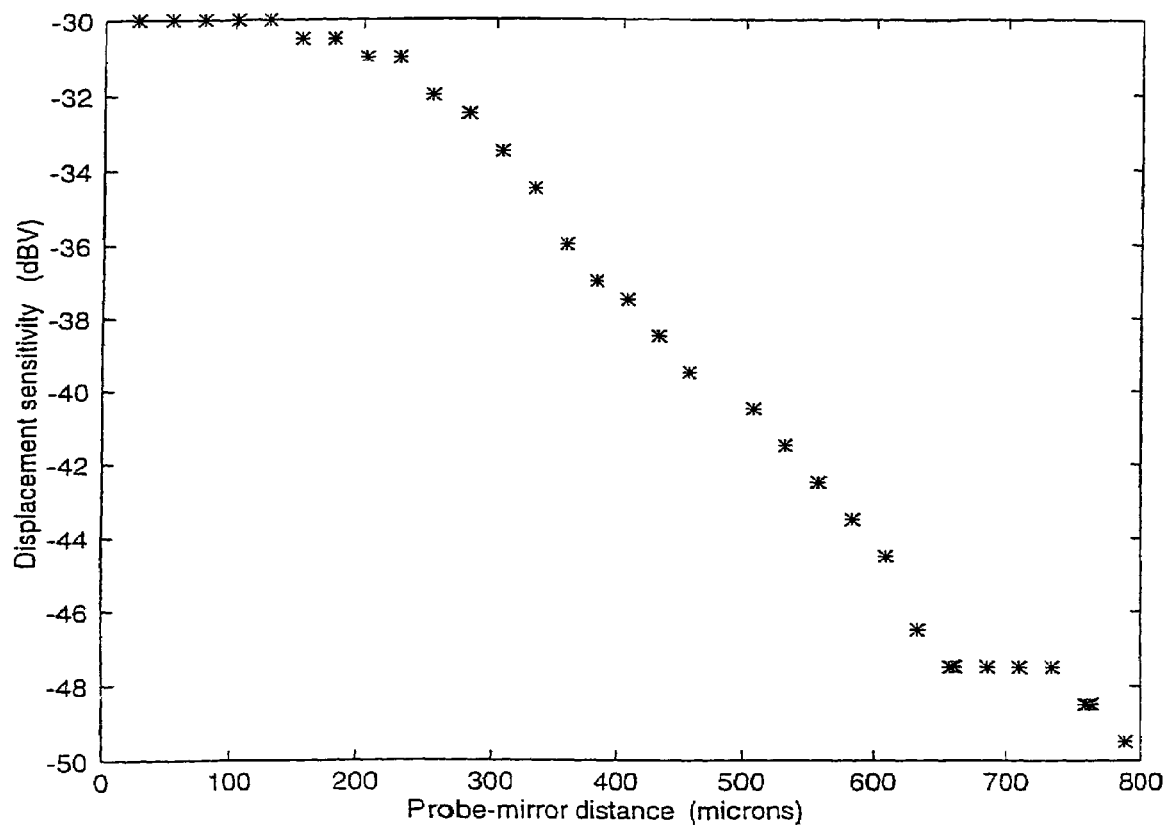
FIG. 6 is a graph plotting the ac displacement sensitivity as a function of probe-mirror distance for an embodiment of a 1 fiber probe according to the instant invention.

Then, the 1 fiber probe was dynamically displaced against the mirror by vibrating the PZT transducer electrically. The displacement amplitude of the vibrating mirror was obtained from the output of a small reference accelerometer (Endevco 2250A) mounted close to the mirror. The results of this test are shown in FIG. 6 where the ac displacement sensitivity is shown as a function of the probe-mirror distance. As can be seen from FIG. 6, the sensitivity is maximum and constant in the 0–150 μm region, in agreement with the dc displacement results of FIG. 5. These results determine that the optimum operating distance of this embodiment of a 1 fiber probe end from the reflecting surface is about 60 μm and the optimum operating region for this embodiment of a 1 fiber probe is 0–120 μm.

In an embodiment of a 7 fiber probe, the seven fibers were inserted in a stainless steel tubing (1.270 mm o.d and 838 μm i.d) by first stripping their coating using a stripper having a 305 μm diameter blade hole. Then, epoxy was applied on the seven fibers, which were forced to form a symmetric bundle close to the tubing end with the transmitting fiber at the center, for example, as shown in FIG. 3b. After the epoxy was cured, the fiber bundle was cut closely to the tubing end and the probe was polished.

Figure 7:
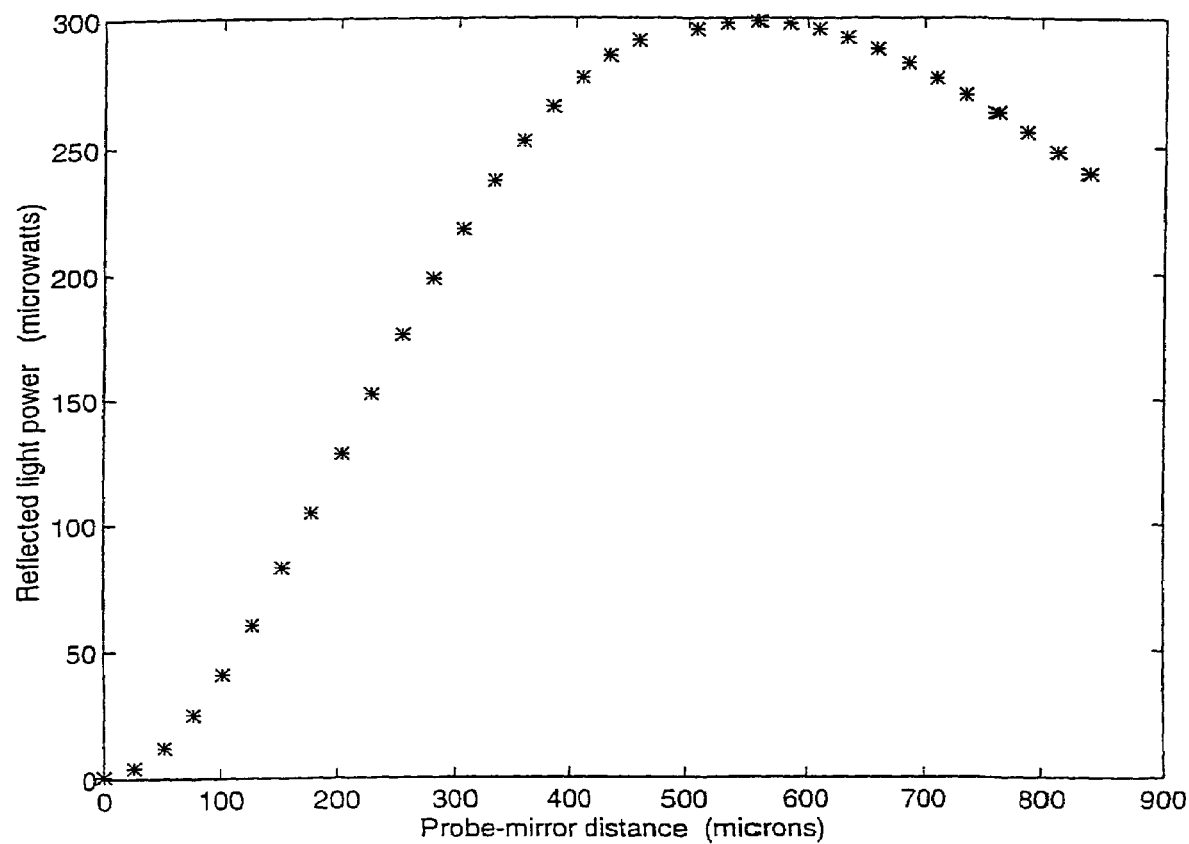
FIG. 7 is a graph plotting the power of the reflected light as a function of probe-mirror distance for an embodiment of a 7 fiber probe according to the instant invention.

The dc displacement sensitivity of this embodiment of a 7 fiber probe, which was studied in a similar way to that of the embodiment of a 1 fiber probe, is shown in FIG. 7 where the reflected light power coupled into the 6 receiving fibers is plotted vs. probe-mirror distance. As shown in FIG. 7, maximum displacement sensitivity for this embodiment of a 7 fiber probe is achieved for 180–250 μm probe-mirror distances and is:

$$\text{dc displacement sensitivity} = 9.38 \times 10^{-11} \text{ W/A}, \quad (1)$$

where $A=10^{-8}$ cm. As can be seen from FIGS. 5 and 7, the region of maximum sensitivity of the embodiment of a 7 fiber probe is different from that of the embodiment of a 1 fiber probe, where the maximum sensitivity region starts from zero distance. Another difference is that the embodiment of a 7 fiber probe showed significantly higher light power detection due primarily to the fiber coupler used in the embodiment of a 1 fiber probe, which reduces the power by at least 50%.

Figure 8:
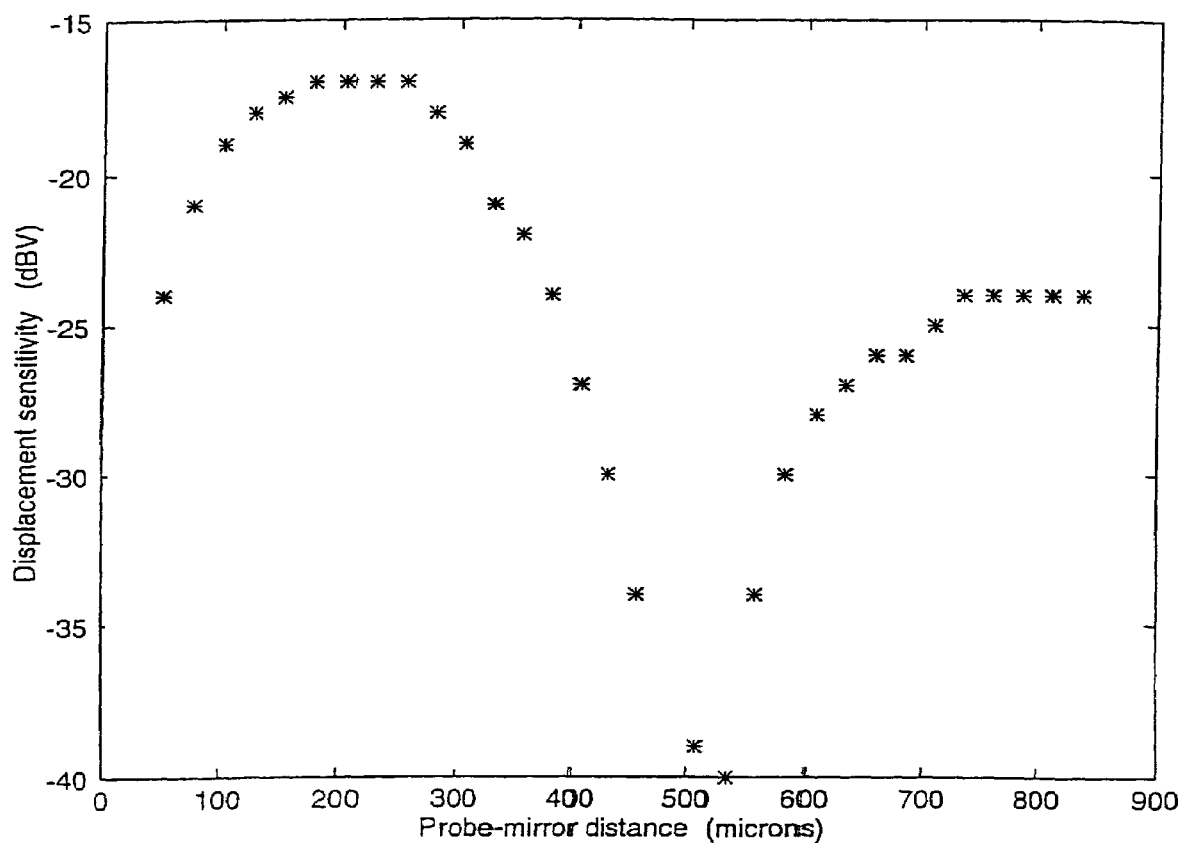
FIG. 8 is a graph plotting the ac displacement sensitivity as a function of probe-mirror distance for an embodiment of a 7 fiber probe according to the instant invention.

The ac displacement sensitivity of the embodiment of a 7 fiber probe, which was obtained in a similar way to that of the embodiment of a 1 fiber probe, is shown in FIG. 8 where the displacement sensitivity is plotted as a function of the probe-mirror distance. As can be seen from FIG. 8, maximum displacement sensitivity for this embodiment of a 7 fiber probe is achieved in the probe-mirror distance range 180–250 μm, in agreement with the dc displacement results of FIG. 7. This maximum displacement sensitivity range determines the optimum probe-reflecting surface distance to be about 220 μm for this embodiment of a 7 fiber probe. From FIGS. 8 and 6 it can be also seen that the maximum ac displacement sensitivity of the embodiment of a 7 fiber probe is 13 dB higher than that of the embodiment of a 1 fiber probe. This significant sensitivity difference and the high cost of the multimode coupler required in the 1 fiber probe are advantages of using the embodiment of a 7 fiber probe instead of the 1 fiber probe, even though the latter sensor uses only one fiber instead of seven. This fiber difference can be significant, however, for remote sensing where long fiber lengths are required.

From FIG. 8, the displacement sensitivity of the embodiment of a 7 fiber probe was calculated from the signals of the probe and the reference accelerometer and was found to be:

$$\text{Displacement sensitivity} = 6.35 \times 10^{31 \; 11} \text{ W/A} \quad (2)$$

This displacement sensitivity is slightly less than the sensitivity $9.38 \times 10^{-11}$ W/A (Eq. 1) calculated from the dc displacement test. This shows that the displacement sensitivity is approximately the same from the displacements used in the dc test (~1") down to the minimum detectable displacement (Eq. 3 below). This dynamic range is about eight orders of magnitude.

The minimum detectable displacement was obtained by using a OPF 370A Optek LED driven at 100 mA current by a LDX-3620 Lightwave Technology power supply (in the battery operation). The detector was a TIA-500 Terahertz Technologies Inc. PIN detector, the output of which was stored into a 3582A HP spectrum analyzer. The fiber optic probe signal obtained with a known mirror displacement was compared to the noise which was the signal obtained with the mirror stationary. From that comparison, the minimum detectable displacement was found to be:

$$\text{Minimum detectable displacement} = 1.1 \text{ A/(Hz)}^{1/2} \quad (3)$$

For a good PIN detector, which can detect a fraction of 1 pW ac signal, the minimum detectable displacement, limited only by the detector noise, is:

$$\text{Minimum detectable displacement} \geq 0.01 \text{A}.$$

The instant fiber optic sensor has a thin etched diaphragm, as described above. These thin etched diaphragms can provide high acoustic sensitivities with relatively small diameters. Such etched diaphragms can be micromachined, or planar processed, reproducibly. An embodiment of a method to construct a silicon, etched diaphragm, for example, is described as follows. The starting material is a commercially available SOI (silicon on insulator) wafer. This wafer has a thin (e.g., 0.1 μm–2 μm) single crystalline silicon layer, a thin silica (sacrificing) layer, and a single crystalline silicon substrate (step I). On the silicon substrate a photoresist polymer is applied in the spin photoresist (step II). Then, using an appropriate photolithography mask, the wafer is exposed to light (step IV). After development, the desired pattern is formed (step IV). In the next reactive ion etching step, the substrate is exposed in a reactive ion beam, which etches away the silicon along the direction of propagation of the ions (step V). After cleaning the photoresist polymer in acetone (step VI), the wafer is dipped in HF in order to remove the silica layer (step VII). Then, the individual, silicon, etched diaphragms are formed by breaking the thin silicon layer (step VII). In this illustrative fabrication process, many silicon diaphragms can be made using the same mask. Using this micromachining process, many etched diaphragms can be formed in a highly reproducible, very stable, and inexpensive way.

For the purpose of determining acoustic sensitivity of an embodiment of a fiber optic sensor having a silicon, etched diaphragm formed as above, the etched diaphragm can be considered to be a semi-clamped circular plate, i.e., a plate halfway between a clamped and a simply supported one. The deflection of the center D of such an etched diaphragm when pressure p is applied is given by the following formula:

$$D = 3 * p * R^4 * B / (16 * E * h^3) \quad (6)$$

where:
  $B = B1 = 1 - v^2$; clamped plate
  $B = B2 = (5+v)/(1+v)$; simply supported plate In Eq. 6, R, h, E, and v are the radius, thickness, the Young's modulus, and the Poisson's ratio of the diaphragm, respectively. For this embodiment of a silicon, etched diaphragm:

$$B = (B1 + B2)/2 \quad (7)$$

For this embodiment of a silicon, etched diaphragm: $E = 190 * 10^{10}$ dynes/cm$^2$; $v = 0.18$.

For a diaphragm with $h = 1$ μm and $R = 1$ mm:
  $D1 = 5.968 * 10^{-7}$ m/Pa; clamped plate
  $D2 = 2.620 * 10^{-7}$ m/Pa; simply supported plate For this embodiment of a silicon, etched diaphragm:

$$D = (D1 + D2)/2 = 1.608 * 10^{-7} \text{ m/Pa}$$

Using the minimum detectable displacement given in Eq. 3, the minimum detectable pressure for this embodiment of a silicon, etched diaphragm is:

$$P_{min} = 0.68 \text{ mPa/(Hz)}^{1/2} \quad (8)$$

This is an excellent minimum detectable pressure for such a pressure sensor having a cross-sectional width of around 1 mm.

The bandwidth of a fiber optic sensor having a silicon, etched diaphragm as constructed above is determined as follows. The resonant frequency Fr of this embodiment of a micromachined silicon, etched diaphragm can be found from the following equation:

$$Fr = (1/2\pi)(c/R^2)(A/k)^{1/2} \quad (9)$$

where: $A=E*h^3*(1/(12*(1-v^2)))$ and $k=\rho*h$; ($\rho=2.3$ gm/cm$^3$, the silicon density).

In Eq. 9, c=10.2; clamped plate c=5 simply supported plate.

For this embodiment of a silicon, etched diaphragm:

$$i\ c=(10.5+5)/2 \tag{10}$$

For this embodiment of a silicon, etched diaphragm of radius R=1 mm and h=1 μm:

$$Fr=12.9\ \text{kHz} \tag{11}$$

By way of comparison, the detectable pressure given by Eq. 8 and the bandwidth determined by Eq. 11 are very close to the requirements of a standard hearing-aid microphone: $P_{min}=0.60$ mPa/(Hz)$^{1/2}$, bandwidth: 100 Hz–14 kHz.

Due to the high degree of control in a planar processing technique, such as the micromachined diaphragm fabrication described above, fiber optic sensors according to the instant invention have highly reproducible and stable characteristics, such as sensitivity, phase, and bandwidth. Such small, light, reproducible, stable and inexpensive fiber optic pressure sensors are suitable in a variety of systems, such as microphone arrays. For example, microphone arrays can be used for more accurate measurements and monitoring of sound fields than is possible with a single microphone. Such an array is useful, for example, in condition monitoring of machinery to alert users of possible impending failures.

Obviously, many modifications and variations of the present invention are possible in light of the above teachings without departing from the true scope and spirit of the invention. It is therefore to be understood that the scope of the invention should be determined by referring to the following appended claims.

What is claimed is:

1. An apparatus comprising:
   an optical fiber for transmitting light, said optical fiber comprising an axis; and
   a semiconductor diaphragm perpendicular to said axis, said diaphragm comprising an operative side located at a distance from said optical fiber sufficient to reflect a portion of the transmitted light into said optical fiber, said diaphragm comprising an exposed side opposite to said operative side, and
   a protective lave adjacent to said exposed side and, in combination with said diaphragm, defining a cavity, said protective layer defining at least one hole.

2. The apparatus according to claim 1, wherein said semiconductor diaphragm comprises at least one of CdTe, CdZnTe, InP, InSb, GaAs, GaN, GaP, GaSb, Ge, Si, SiGe, Sn, ZnSe, ZnS, an oxide thereof, an a diamond.

3. The apparatus according to claim 1, wherein said semiconductor diaphragm comprises at least one of a diaphragm thickness between 0.1 μm and 2 μm, and a cross-sectional width between 0.1 mm and 5 mm.

4. The apparatus according to claim 1, wherein said semiconductor diaphragm comprises a reflective layer for reflecting the portion of the light into said optical fiber.

5. The apparatus according to claim 4, wherein said reflective layer comprises at least one of aluminum, beryllium, chromium, copper, gold, molybdenum, nickel, platinum, rhodium, silver, tungsten, and an alloy thereof.

6. The apparatus according to claim 1, wherein said protective layer comprises at least one of a semiconductor, an oxide ceramic, and a non-oxide ceramic.

7. The apparatus according to claim 6, wherein said semiconductor comprises at least one of CdTe, CdZnTe, InP, InSb, GaAs, GaN, GaP, GaSb, Ge, Si, SiGe, Sn, ZnSe, ZnS, an oxide thereof, and a diamond,
   wherein said oxide ceramic comprises at least one of MgO, TiO$_2$, SiO$_2$, MnO$_2$, Cr$_2$O$_3$. Fe$_2$O$_3$, and Al$_2$O$_3$, and
   wherein said non-oxide ceramic comprises at least one of BN and TiB$_2$.

8. The apparatus according to claim 1, further comprising:
   a housing surrounding said optical fiber,
   a head enclosing a portion of said housing, said housing and said head defining a gas reservoir; said head comprising a spacer between said optical fiber and said diaphragm, said spacer defining at least one aperture communicating with said gas reservoir.

9. The apparatus according to claim 8, wherein said spacer comprises a spacer thickness, said spacer thickness hem equal to said distance.

10. The apparatus according to claim 1, wherein said distance is one of between 170 μm and 270 μm and between 700 μm and 1100 μm.

11. The apparatus according to claim 1, further comprising:
    a light source communicating with said optical fiber for generating the light transmitted through said optical fiber.

12. The apparatus according to claim 11, wherein said light source comprises at least one of a light emitting diode and a laser diode.

13. The apparatus according to claim 1, further comprising:
    a photodetector communicating with said optical fiber to receive the portion of reflected light.

14. The apparatus according to claim 13, wherein said photodetector comprises at least one of a PIN detector, a avalanche photodiode, a photomultiplier tube, and a metal-semiconductor-metal detector.

15. An apparatus comprising:
    a transmitting optical fiber for transmitting light, said transmitting optical fiber comprising a transmitting end having a transmitting axis;
    at least one receiving optical fiber comprising a receiving end having a receiving axis; and
    a semiconductor diaphragm perpendicular to said transmitting axis and said receiving axis, and located at a distance from said optical fiber sufficient to reflect a portion of the light from said transmitting end to said receiving end, said diaphragm comprising an exposed side opposite to said operative side, and
    a protective layer adjacent to said exposed side and, in combination with said diaphragm, defining a cavity, said protective layer defining at least one hole.

16. The apparatus according to claim 15, wherein said at least one receiving optical fiber comprises a plurality of receiving optical fibers.

17. The apparatus according to claim 16, wherein said plurality of receiving optical fibers comprises at least one of three, four, five, six, seven, and eight receiving optical fibers.

18. The apparatus according to claim 15, wherein said semiconductor diaphragm comprises at least one of CdTe, InP, InSb, GaAs, GaN, GaP, GaSb, Ge, Si, SiGe, Sn, ZnSe, ZnS, an oxide thereof, and diamond.

19. The apparatus according to claim 15, wherein said semiconductor diaphragm comprises at least one of a diaphragm thickness between 0.1 μm arid 2 μm, and a cross-sectional width between 0.1 μmm and 5 mm.

20. The apparatus according to claim 15, wherein said semiconductor diaphragm comprises a reflective layer for reflecting the portion of the light into said receiving end.

21. The apparatus according to claim 20, wherein said reflective layer comprises at least one of aluminum, beryllium, chromium, copper, gold, molybdenum, nickel, platinum, rhodium, silver, tungsten, and an alloy thereof.

22. The apparatus according to claim 15, wherein said protective layer comprises at least one of a semiconductor, an oxide ceramic, and a non-oxide ceramic.

23. The apparatus according to claim 22, wherein said semiconductor comprises at least one of CdTe, CdZnTe, InP, InSb, GaAs, GaN, GaP, GaSb, Ge, Si, SiGe, Sn, ZnSe, ZnS, an oxide thereof, and a diamond,
wherein said oxide ceramic comprises at least one of $MgO$, $TiO_2$, $SiO_2$, $MnO_2$, $Cr_2O_3$, $Fe_2O_3$, and $Al_2O_3$, and
wherein said non-oxide ceramic comprises at least one of BN and $TiB_2$.

24. The apparatus according to claim 15, further comprising:
a housing surrounding said optical fiber, and
a head enclosing a portion of said housing, said housing and said head defining a gas reservoir; said head comprising a spacer between said optical fiber and said diaphragm, said spacer defining at east one aperture communicating with said gas reservoir.

25. The apparatus according to claim 24, wherein said spacer comprises a spacer thickness, said spacer thickness being equal to said distance.

26. The apparatus according to claim 15, wherein said distance is one of between 170 μm and 270 μm and between 700 μm and 1100 μm.

27. The apparatus according to claim 15, further comprising:
a light source communicating with said transmitting optical fiber for generating the light transmitted through said transmitting optical fiber.

28. The apparatus according to claim 27, wherein said light source comprises at least one of a light emitting diode and a laser diode.

29. The apparatus according to claim 15, further comprising:
a photodetector communicating with said optical fiber to receive the portion of reflected light.

30. The apparatus according to claim 29, wherein said photodetector comprises at least one of a PIN detector, an avalanche photodiode, a photomultiplier tube, and a metal-semiconductor-metal detector.

31. An apparatus comprising:
a transmitting optical fiber for transmitting light, said transmitting optical fiber comprising a transmitting end having a transmitting axis;
at least one receiving optical fiber comprising a receiving end having a receiving axis parallel to said transmitting axis; and
a semiconductor diaphragm located at a distance from said optical fiber sufficient to reflect a portion of the light from said transmitting end to said receiving end, said diaphragm comprising an exposed side opposite to said operative side, and
a protective layer adjacent to said exposed side and, in combination with said diaphragm, defining a cavity, said protective layer defining at least one hole.

32. The apparatus according to claim 31, wherein said at least one receiving optical fiber comprises a plurality of receiving optical fibers.

33. The apparatus according to claim 32, wherein said plurality of receiving optical fibers comprises at least one of three, four, five, six, seven, and eight receiving optical fibers.

34. The apparatus according to claim 31, wherein said semiconductor diaphragm comprises at least one of CdTe, CdZnTe, InP, InSb, GaAs, GaN, GaP, GaSb, Ge, Si, SiGe, Sn, ZnSe, ZnS, an oxide thereof, and a diamond.

35. The apparatus according to claim 31, wherein said semiconductor diaphragm comprises at least one of a diaphragm thickness between 0.1 μm and 2 μm, and a cross-sectional width between 0.1 μm and 5 mm.

36. The apparatus according to claim 31, wherein said semiconductor diaphragm comprises a reflective layer for reflecting the portion of the light into said receiving end.

37. The apparatus according to claim 36, wherein said reflective layer comprises at least one of aluminum, beryllium, chromium, copper, gold, molybdenum, nickel, platinum, rhodium, silver, tungsten, and an alloy thereof.

38. The apparatus according to claim 31, wherein said protective layer comprises at least one of a semiconductor, an oxide ceramic, and a non-oxide ceramic.

39. The apparatus according to claim 38, wherein said semiconductor comprises at least one of CdTe, CdZnTe, InP, InSb, GaAs, GaN, GaP, GaSb, Ge, Si, SiGe, Sn, ZnSe, ZnS, an oxide thereof, and a diamond,
wherein said oxide ceramic comprises at least one of $MgO$, $TiO_2$, $SiO_2$, $MnO$, $Cr^2O_3$, $Fe_2O_3$, and $Al_2O_3$, and
wherein said non-oxide ceramic comprises at least one of BN and $TiB_2$.

40. The apparatus according to claim 31, further comprising:
a housing surrounding said optical fiber, and
a head enclosing a portion of said housing, said housing and said head defining a gas reservoir; said head comprising a spacer between said optical fiber and said diaphragm, said spacer defining at least one aperture communicating with said gas reservoir.

41. The apparatus according to claim 40, wherein said spacer comprises a spacer thickness, said spacer thickness being equal to said distance.

42. The apparatus according to claim 31, wherein said distance is one of between 170 μm and 270 μm, and between 700 μm and 1100 μm.

43. The apparatus according to claim 31, further comprising:
a light source communicating with said transmitting optical fiber for generating the light transmitted through said transmitting optical fiber.

44. The apparatus according to claim 43, wherein said light source comprises at least one of a light emitting diode and a laser diode.

45. The apparatus according to claim 31, further comprising:
a photodetector communicating with said optical fiber to receive the portion of reflected light.

46. The apparatus according to claim 45, wherein said photodetector comprises at least one of a PIN detector, an avalanche photodiode, a photomultiplier tube, and a metal-semiconductor-metal detector.

47. An apparatus comprising:
an optical fiber for transmitting light, said optical fiber comprising an axis; and
a diaphragm perpendicular to said axis, said diaphragm comprising an operative side located at a distance from said optical fiber sufficient to reflect a portion of the transmitted light into said optical fiber, said diaphragm comprising an exposed side opposite to said operative side, and a protective layer adjacent to said exposed side and, in combination with said diaphragm, defining a cavity, said protective layer defining at least one hole.

48. The apparatus according to claim 47, wherein said etched diaphragm comprises at least one of a reactive ion etched diaphragm, a chemical etched diaphragm, and a mechanical etched diaphragm.

49. The apparatus according to claim 47, wherein said etched diaphragm comprises at least one of a diaphragm thickness between 0.1 µm and 2 µm, and a cross-sectional width between 0.1 mm and 5 mm.

50. The apparatus according to claim 47,
wherein said semiconductor comprises at least one of CdTe, CdZnTe, InP, InSb, GaAs, GaN, GaP, GaSb, Ge, Si, SiGe, Sn, SiC, ZnSe, ZnS, an oxide thereof, and a diamond,
wherein said dielectric comprises at least one of $SiO_2$, SiN, SiC, and $Si_3N_4$, and
wherein said metal comprises at least one aluminum, beryllium, chromium, copper, gold, molybdenum, nickel, platinum, rhodium, silver, tungsten, and an alloy thereof.

51. An apparatus comprising:
a transmitting optical fiber for transmitting light, said transmitting optical fiber comprising a transmitting end having a transmitting axis;
at least one receiving optical fiber comprising a receiving end having a receiving axis; and
a diaphragm perpendicular to said transmitting axis and said receiving axis, and located at a distance from said optical fiber sufficient to reflect a portion of the light from said transmitting end to said receiving end, said diaphragm comprising an exposed side opposite to said operative side, and
a protective layer adjacent to said exposed side and, in combination with said diaphragm, defining a cavity, said protective layer defining at least one hole.

52. The apparatus according to claim 51, wherein said diaphragm comprises at least one of a diaphragm thickness between 0.1 µm and 2 µm, and a cross-sectional width between 0.1 mm and 5 mm.

53. The apparatus according to claim 51,
wherein said semiconductor comprises at least one of CdTe, CdZnTe, InP, InSb, GaAs, GaN, GaP, GaSb, Ge, Si, SiGe, Sn, SiC, ZnSe, ZnS, an oxide thereof and a diamond,
wherein said dielectric comprises at least one of $SiO_2$, SiN, SiC, and $Si_3N_4$, and
wherein said metal comprises at least one aluminum, beryllium, chromium, copper, gold, molybdenum, nickel, platinum, rhodium, silver, tungsten, and an alloy thereof.

54. An apparatus comprising:
a transmitting optical fiber for transmitting light, said transmitting optical fiber comprising a transmitting end having a transmitting axis;
at least one receiving optical fiber comprising a receiving end having a receiving axis parallel to said transmitting axis; and
a diaphragm located at a distance from said optical fiber sufficient to relied a portion of the light from said transmitting end to said receiving end, wherein said etched diaphragm comprises a semiconductor, a dielectric, and a metal, said diaphragm comprising an exposed side opposite to said operative side, and
a protective layer adjacent to said exposed side and, in combination with said diaphragm, defining a cavity, said protective layer defining at least one hole.

55. The apparatus according to claim 54, wherein said etched diaphragm comprises at least one of a diaphragm thickness between 0.1 µm and 2 µm, and a cross-sectional width between 0.1 mm and 5 mm.

56. The apparatus according to claim 54,
wherein said semiconductor comprises at least one of CdTe, CdZnTe, InP, InSb, GaAs, GaN, GaP, GaSb, Ge, Si, SiGe, Sn, SiC, ZnSe, ZnS, an oxide thereof, and a diamond,
wherein said dielectric comprises at least one of $SiO_2$, SiN, SiC, and $Si_3N_4$, and
wherein said metal comprises at least one aluminum, beryllium, chromium, copper, gold, molybdenum, nickel, platinum, rhodium, silver, tungsten, and an alloy thereof.

* * * * *